(12) United States Patent
Soundararajan et al.

(10) Patent No.: US 11,706,017 B2
(45) Date of Patent: Jul. 18, 2023

(54) INTEGRATION OF BLOCKCHAIN-ENABLED READERS WITH BLOCKCHAIN NETWORK USING MACHINE-TO-MACHINE COMMUNICATION PROTOCOL

(71) Applicant: HEWLETT PACKARD ENTERPRISE DEVELOPMENT LP, Houston, TX (US)

(72) Inventors: Abilash Soundararajan, Bangalore (IN); Michael Reid Tennefoss, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 192 days.

(21) Appl. No.: 17/070,076

(22) Filed: Oct. 14, 2020

(65) Prior Publication Data

US 2021/0126769 A1 Apr. 29, 2021

(30) Foreign Application Priority Data

Oct. 24, 2019 (IN) .............................. 201941043343

(51) Int. Cl.
*H04L 9/40* (2022.01)
*H04L 9/06* (2006.01)
(Continued)

(52) U.S. Cl.
CPC .............. *H04L 9/0618* (2013.01); *H04L 9/30* (2013.01); *H04L 63/10* (2013.01); *H04L 69/08* (2013.01); *H04L 9/50* (2022.05)

(58) Field of Classification Search
CPC .................................................... H04L 63/10
See application file for complete search history.

(56) References Cited

U.S. PATENT DOCUMENTS 10,832,337 B1 * 11/2020 Floyd ..................... G06Q 50/26
2016/0275461 A1 * 9/2016 Sprague ................ H04W 12/06
(Continued)

FOREIGN PATENT DOCUMENTS

| CN | 109167768 | 1/2019 |
| WO | WO-2018190983 | 10/2018 |
| WO | WO-2018234741 | 12/2018 |

OTHER PUBLICATIONS

Omar et al. Identity Management in IoT Networks Using Blockchain and Smart Contracts IEEE Confs on Internet of Things, Green Computing and Communications, Cyber, Physical and Social Computing, Smart Data, Blockchain, Computer and Information Technology, Congress on Cybermatics (Year: 2018).*

(Continued)

*Primary Examiner* — David J Pearson
(74) *Attorney, Agent, or Firm* — Hewlett Packard Enterprise Patent Department (57) ABSTRACT

Examples described herein relate to integrating a blockchain-enabled reader with a blockchain network over machine-to-machine communication protocol. A subscriber node may receive event data published by a publisher node. The event data may be communicated to the publisher node from a blockchain-enabled reader using a machine-to-machine communication protocol. The event data may be attested by the blockchain-enabled reader using a decentralized identity provisioned to the blockchain-enabled reader from the blockchain network. The decentralized identity of the blockchain-enabled reader may be verified. The event data may be submitted by the subscriber node to a distributed ledger upon successful verification of the decentralized identity of the blockchain-enabled reader.

20 Claims, 6 Drawing Sheets

(51) Int. Cl.
  *H04L 69/08* (2022.01)
  *H04L 9/30* (2006.01)
  *H04L 9/00* (2022.01)

(56) References Cited

U.S. PATENT DOCUMENTS

| | | | | |
|---|---|---|---|---|
| 2018/0262493 | A1* | 9/2018 | Andrade | G06F 21/31 |
| 2018/0278422 | A1* | 9/2018 | Young | G06Q 10/02 |
| 2019/0197574 | A1* | 6/2019 | Berman | G06Q 30/0233 |
| 2020/0005415 | A1* | 1/2020 | Schuler | H04L 67/1097 |
| 2020/0014529 | A1* | 1/2020 | Kanza | H04W 12/64 |
| 2020/0034454 | A1* | 1/2020 | Chamarajnager | H04W 4/38 |
| 2020/0045019 | A1* | 2/2020 | Huang | H04L 9/50 |
| 2020/0322132 | A1* | 10/2020 | Covaci | H04L 9/3239 |
| 2020/0349569 | A1* | 11/2020 | Murao | G06Q 50/30 |
| 2021/0004794 | A1* | 1/2021 | Kumar Kumaresan | G06Q 30/0645 |
| 2021/0136042 | A1* | 5/2021 | Wang | H04L 9/3236 |

OTHER PUBLICATIONS

Holland, M. et al., "Copyright Protection in Additive Manufacturing with Blockchain Approach," Jul. 2017, 9 Pgs.
Marcon, P. et al., "New Approaches to implementing the Smartjacket Into Industry 4.0," Apr. 2019, 21 Pgs.
Prostep AG, "Opendxm Globalx Supports Blockchain Technology," 2019, 3 pages.
Punter, M. et al., "Blockchain Technology in IDS," Mar. 2019, 15 Pgs.

\* cited by examiner

INTEGRATION OF BLOCKCHAIN-ENABLED READERS WITH BLOCKCHAIN NETWORK USING MACHINE-TO-MACHINE COMMUNICATION PROTOCOL

BACKGROUND

Generally, "Internet-of-Things" (IoT) refers to the interconnection of devices within a local and/or wide area network infrastructure, including the Internet. The IoT enables a wide-range of applications in which virtually any type of physical thing may provide information about itself or its surroundings and/or may be controlled remotely via client devices.

BRIEF DESCRIPTION OF THE DRAWINGS

These and other features, aspects, and advantages of the present specification will become better understood when the following detailed description is read with reference to the accompanying drawings in which like characters represent like parts throughout the drawings, wherein.

It is emphasized that, in the drawings, various features are not drawn to scale. In fact, in the drawings, the dimensions of the various features have been arbitrarily increased or reduced for clarity of discussion.

DETAILED DESCRIPTION

The following detailed description refers to the accompanying drawings. Wherever possible, same reference numbers are used in the drawings and the following description to refer to the same or similar parts. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

The terminology used herein is for the purpose of describing particular examples and is not intended to be limiting. As used herein, the singular forms "a," "an," and "the" are intended to include the plural forms as well, unless the context clearly indicates otherwise. The term "another," as used herein, is defined as at least a second or more. The term "coupled," as used herein, is defined as connected, whether directly without any intervening elements or indirectly with at least one intervening element, unless indicated otherwise. For example, two elements can be coupled mechanically, electrically, or communicatively linked through a communication channel, pathway, network, or system. The term "and/or" as used herein refers to and encompasses any and all possible combinations of the associated listed items. It will also be understood that, although the terms first, second, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

"Internet of Things" (IoT) devices when connected over a network or the Internet may enable wide-range of applications for industrial, logistics, and other automation markets. An IoT device may be controlled remotely, including over the Internet. Examples of an IoT device may include a radio frequency identification (RFID) tag, a Bluetooth device/tag, various readers, such as, an RFID scanner, a Near-Field Communication (NFC) reader, a Bluetooth reader, a sensor unit, optical scanners, acoustic scanners, and holographic readers, combinations thereof, and/or any other device capable of reading, scanning, or sensing various parameters.

Further, in recent times, the use of blockchain technology has gained traction because of features including immutable storage of data, validation, and authorization techniques. In a typical blockchain network, data may be stored as chronologically ordered, back-link listed data blocks, which form a "blockchain." Numbers of data blocks in the blockchain are connected together via hashing. For example, when a new block is added to the blockchain, the new block may include a hash reference, such as a hash of a predecessor block. In this manner, several data blocks may be chained together to form the blockchain. Each additional block creates additional security by further validating the entire blockchain, making it difficult to retroactively alter data stored within the blockchain without detection. A blockchain may include information about participating nodes, an owner of a block, and content of blocks starting from a first block and extending to a most recently completed block (also referred to as a latest data block).

Currently available IoT devices such as RFID scanners, optical scanners, acoustic scanners, holographic readers, and/or other sensors query and/or observe tags for their identification. Further, these IoT devices may also store and/or communicate such observed data to remote devices and/or computing nodes that consume this data over many different protocols.

Efforts have been made to integrate IoT infrastructure with a blockchain network. However, in such example cases, the IoT devices (e.g., the readers) are governed and controlled by different identity mechanisms not recognized by a blockchain network. For example, the readers can generate data that may be consumed by participating nodes in the blockchain network, but these IoT devices are not designed to be participating nodes in a blockchain network or otherwise interact with the participating nodes in the blockchain network. Without a blockchain-based identity, the scanned data may not be signed into a blockchain network, and the integrity of shared data may be lost or may require a third party to validate identity, which itself may break the chain of trust. This issue is particularly acute in industrial, manufacturing, and logistics applications, where the readers are essential components in large automation systems.

Many of these applications commonly use machine-to-machine communication protocols, such as, but not limited to, the Open Platform Communications (OPC) standard, OPC Unified Architecture (OPC UA) standard (e.g., International Electrotechnical Commission (IEC) 62541 standard), Message Queuing Telemetry Transport (MQTT), Constrained Application Protocol (CoAP), and other Industrial IoT Publisher Subscriber architecture based protocols for communicating with industrial equipment and systems for data collection and control. Some of these protocols may include security features such as authentication, authorization, encryption, and signature-based data integrity. However, these protocols may lack aspects and benefits of a decentralized identity. For example, the OPC UA protocol may lacks the ability to manage blockchain identity (decentralized identity), and/or facilitate readers' acceptance of the blockchain identity.

Moreover, the IoT infrastructure may include several IoT devices connected to an IoT gateway via the Internet and/or a private communication link. As will be understood, these IoT devices may generate different types of information, and in different data formats, than the data formats that are used to store data in the blockchain.

To that end, in accordance with the aspects of the present disclosure, a blockchain IoT system is presented that circumvents the various issues noted herein. The blockchain IoT system includes a publisher node to publish event data received from a blockchain-enabled reader using a machine-to-machine communication protocol, wherein the event data is attested by the blockchain-enabled reader using a decentralized identity. The blockchain IoT system further includes a subscriber node as a participating node in a blockchain network. The subscriber node receives the event data published by the publisher node. Further, the subscriber node verifies the decentralized identity of the blockchain-enabled reader, wherein the decentralized identity is provisioned to the blockchain-enabled reader from the blockchain network. Further, the subscriber node submits the event data for storage in a distributed ledger upon successful verification of decentralized identity of the blockchain-enabled reader.

As will be appreciated, the blockchain-enabled reader in accordance with various aspects of the present disclosure may be registered with the blockchain network and may be provisioned using a decentralized identity from the blockchain network. Therefore, once the decentralized identity in the event data received from such blockchain-enabled reader is verified, the blockchain-enabled reader may be considered trusted and the event data can be accepted for further processing.

Further, the blockchain-enabled reader communicates with the publisher node using a machine-to-machine communication protocol such as the OPC standard, OPC UA standard, MQTT, CoAP or other IoT standards in conjunction with the decentralized identity, where the publisher node operates as per a publisher-subscriber configuration. Such publisher-subscriber configuration can facilitate communications with multiple subscribers and/or multiple sources of data.

Moreover, the subscriber node in the proposed blockchain network, in accordance with the aspects of the present disclosure, may process the received event data. Various processing performed by the subscriber node may include one or more of the following: removing duplicate entries from the event data, arranging parameters contained in the event data in a predefined template, removing a predetermined type of information from the event data, or any other processing for IoT data management, thereby retaining at least some contextual information of the event data. Accordingly, the proposed solution facilitates storage of relevant and structured data in the distributed ledger.

Figure 1:
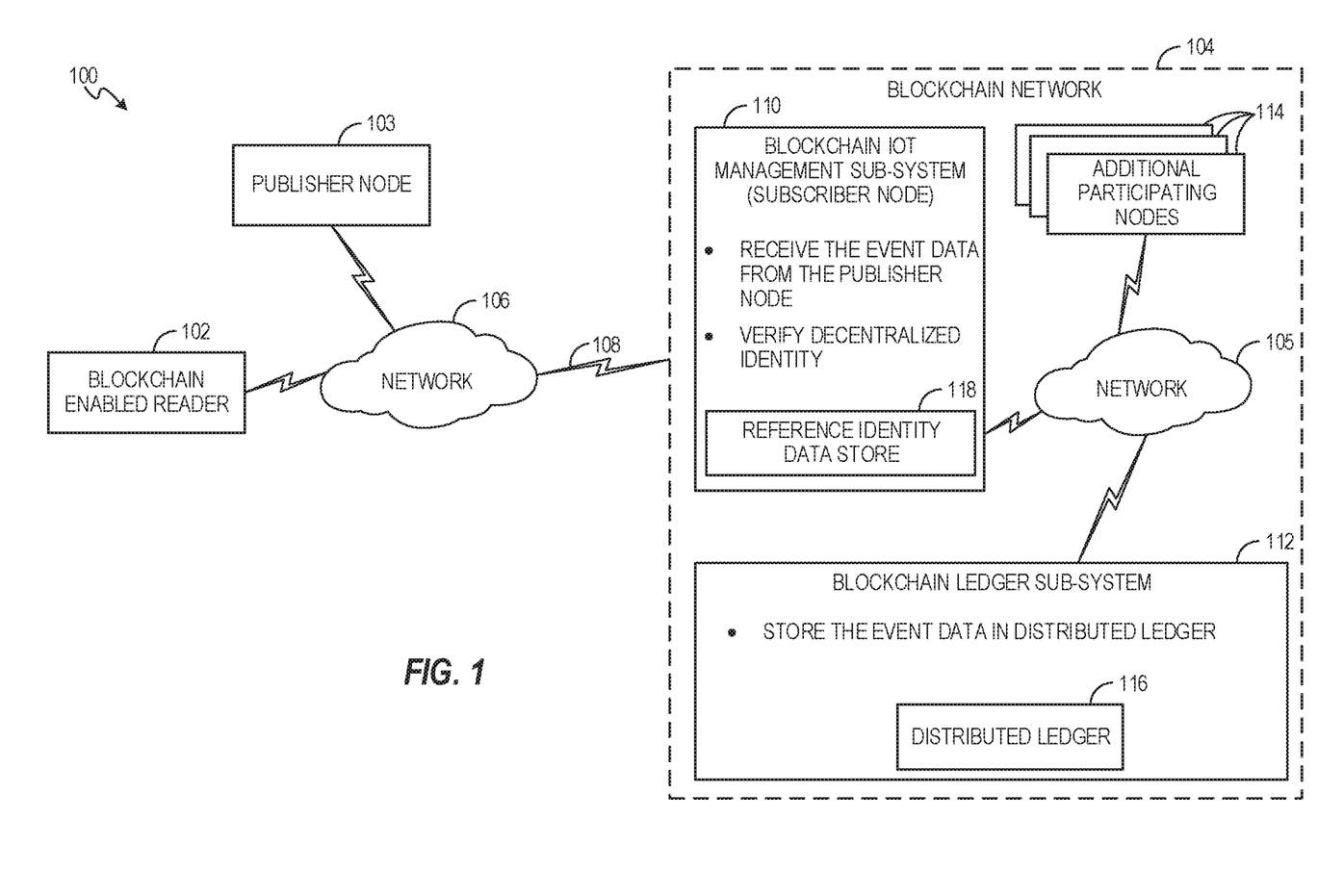
FIG. 1 illustrates a blockchain based Internet-of-Things (IoT) system, in accordance with an example.

Turning to FIG. 1, an example blockchain based Internet-of-Things (IoT) system 100 (hereinafter referred to as a blockchain IoT system 100) is illustrated. As shown in FIG. 1, blockchain IoT system 100 may include a blockchain IoT device such as a blockchain-enabled reader 102, a publisher node 103, and a blockchain network 104. In some examples, blockchain-enabled reader 102 and publisher node 103 may be a common device or system. Blockchain-enabled reader 102, publisher node 103, and blockchain network 104, may be coupled to a network 106.

Example network 106 may be a medium that interconnects blockchain-enabled reader 102, publisher node 103, and blockchain network 104. Examples of network 106 may include, but are not limited to, an Internet Protocol (IP) or non-IP-based local area network (LAN), wireless LAN (WLAN), metropolitan area network (MAN), wide area network (WAN), a cellular communication network, and the Internet. Communication over network 106 may be performed in accordance with various communication protocols from Layer 1 to Layer 7 of OSI stack such as, but not limited to, Transmission Control Protocol and Internet Protocol (TCP/IP), User Datagram Protocol (UDP), IEEE 802.11, and/or cellular communication protocols over communication links 108. Communication links 108 may be enabled via wired (e.g., copper, optical communication, etc.) or wireless (e.g., WiFi®, cellular communication, satellite communication, Bluetooth, etc.) communication technologies. In some examples, network 106 may be enabled via private communication links including but not limited to, communication links established via Bluetooth, cellular communication, optical communication, radio frequency communication, and the like. In some examples, blockchain-enabled reader 102 may be coupled to publisher node 103 via a private communication link and/or a private network.

The term "blockchain-enabled reader" may refer to a device having a decentralized identity and which can read information via techniques including, but not limited to, optical scanning, radio frequency scanning, X-ray scanning, ultrasound scanning, audio scanning, and/or combinations thereof. Non-limiting examples of blockchain-enabled reader 102 may include, a RFID scanner, a NFC reader, a Bluetooth reader, a camera, an X-ray scanner, an ultrasound scanner, a microphone, and the like. In some examples, the blockchain-enabled reader 102 is capable of communicating with other devices and network systems (e.g., publisher node 103 and/or blockchain network 202) using a machine-to-machine communication protocol using a publisher-publisher model. Examples of the machine-to-machine communication protocol may include, but are not limited to, the OPC standard, the OPC UA standard (i.e., IEC 62541 standard), MQTT, and CoAP.

Although one example blockchain-enabled reader 102 is depicted in FIG. 1 for purposes of clarity and conciseness, blockchain IoT system 100 may include any number of blockchain-enabled readers. Blockchain-enabled reader 102 may generate event data that is representative of particulars associated with an object being read by blockchain-enabled reader 102. For example, if blockchain-enabled reader 102 is an RFID scanner, the event data generated by blockchain-enabled reader 102 may be representative of particulars corresponding to an RFID tag (not shown) being scanned by blockchain-enabled reader 102. The particulars associated with the RFID tag may include information pertaining to a component (e.g., device, component, machine, etc.) to which the RFID tag is applied.

In some examples, blockchain-enabled reader 102 may be assigned an identity, such as, a decentralized identity. The decentralized identity assigned to blockchain-enabled reader 102 may uniquely identify blockchain-enabled reader 102 in blockchain network 104. The term "decentralized identity" as used herein may refer to a self-sovereign identifier provisioned to blockchain-enabled reader 102 without any intervening or a centralized administrative authorities. For example, in blockchain IoT system 100 of FIG. 1, the decentralized identity may be provisioned to blockchain-enabled reader 102 from blockchain network 104, as described further herein. The decentralized identity may be used by blockchain-enabled reader 102 to present a verifiable claim to blockchain network 104. In particular, blockchain-enabled reader 102 may attest (i.e., sign) the event data generated by blockchain-enabled reader 102 using its decentralized identity. In some examples, the event data generated by blockchain-enabled reader 102 may include a signature based on its decentralized identity.

In accordance with some aspects of the present disclosure, the decentralized identity may include a public key, a private key, and/or an attribute corresponding to blockchain-enabled reader 102 issued by blockchain network 104 to blockchain-enabled reader 102. The public key may be used to allow access to the event data stored on a distributed ledger, as described further herein, to a requester. The requester may be a user, a customer, a computing node, a company, etc. The private key may be used by blockchain-enabled reader 102 to submit the attested event data for entry (storage) in the distributed ledger. The term "attribute" as used herein may refer to one or more additional identification details of blockchain-enabled reader 102, including but not limited to a class of blockchain-enabled reader 102, an identification number of blockchain-enabled reader 102, details of a custodian of blockchain-enabled reader 102, a name or identification of an organization in which blockchain-enabled reader 102 is deployed, a geographical location of the organization, a city of the organization, information about the infrastructure of the organization in which blockchain-enabled reader 102 is deployed, a physical location of the blockchain-enabled reader 102; e.g. a floor of a building in which blockchain-enabled reader 102 is deployed, a zone or floor at which blockchain-enabled reader 102 is deployed, location coordinates of blockchain-enabled reader 102, etc. In some embodiments, the details of a decentralized identity may be maintained in the form of a Decentralized Identifier (DID) document that describes how to use that specific decentralized identity.

In particular, in some examples, blockchain-enabled reader 102 may attest the event data using the decentralized identity. In certain examples, blockchain-enabled reader 102 may have the decentralized identity in addition to a legacy identity that is provisioned to blockchain-enabled reader 102 based on the machine-to-machine communication protocol over which blockchain-enabled reader 102 communicates its data. For example, such legacy identity may be an OPC UA certificate issued to blockchain-enabled reader 102. By way of example, the OPC UA certificate may include information, such as but not limited to, a Uniform Resource Identifier (URI), a Domain Name System (DNS) name, an Internet Protocol (IP) address, a serial number of the certificate, details of issuing party, details of recipient of the certificate, validity period, and/or the signature algorithm used.

The attested event data generated by blockchain-enabled reader 102 may be communicated to publisher node 103 via network 106 using the machine-to-machine communication protocol. As previously noted, the event data may include a signature based on the decentralized identity of blockchain-enabled reader 102. Blockchain-enabled reader 102 may send the event data to publisher node 103 when an event occurs. The term "event" as used herein may refer to an act that causes blockchain-enabled reader 102 to generate event data. For example, the event may be an instance when blockchain-enabled reader 102 scans a target (e.g., RFID tag) which causes blockchain-enabled reader 102 to generate the event data.

Publisher node 103 may be a computing node such as a computer, a device including a processor or microcontroller and/or any other electronic component, device, or system that performs one or more operations according to one or more programming instructions. Examples of publisher node 103 may include, but are not limited to, a desktop computer, a laptop, a smartphone, a server system, a computer appliance, a network appliance, a workstation, a local IoT gateway, a programmable logic controller, a data gathering panel, a remote terminal unit, and the like. Publisher node 103, although not shown, may include at least one processing resource and a machine readable medium. Non-limiting examples of the processing resource may include a microcontroller, a microprocessor, central processing unit core(s), application-specific integrated circuit (ASIC), a field programmable gate array (FPGA), etc. The machine readable medium may be a non-transitory storage medium, examples of which include, but are not limited to, a random access memory (RAM), a read-only memory (ROM), an electrically erasable programmable read-only memory (EEPROM), a flash memory, a hard disk drive, etc. The processing resource may execute instructions (i.e., programming or software code) stored on the machine readable medium to perform operations desired to be performed by publisher node 103. Additionally or alternately, the processing resource may include electronic circuitry for performing the functionality described herein.

In the example of FIG. 1, publisher node 103 is shown as a computing node disposed outside of blockchain network 104 (i.e., publisher node 103 being non-participating node in blockchain network 104). In some other examples, publisher node 103 may be one of the participating nodes in blockchain network 104. Further, in certain examples, the functionalities of publisher node 103 may be integrated into blockchain-enabled reader 102 itself, without limiting the scope of the present disclosure. Also, in some examples, a decentralized identity may also be assigned to publisher node 102 from blockchain network 104. The decentralized identity of publisher node 103 may include a private key, a public key, and an attribute (e.g., location information, details of a custodian, expected parameters of the event data, etc.) corresponding to publisher node 103.

Publisher node 103 may receive the event data from blockchain-enabled reader 102 in accordance with the machine-to-machine communication protocol. The machine-to-machine communication protocol that may be used to communicate the event data from blockchain-enabled reader 102 to publisher node 103 may include, but is not limited to, the OPC standard, the OPC UA standard, MQTT, CoAP, or similar standards. In some examples, publisher node 103 may implement a publish-subscribe feature. For example, the publish-subscribe feature may be an analogue to the "PubSub" specification enabled by the OPC UA standard and may act as a message-oriented middleware between blockchain-enabled reader 102 and any subscriber, as described further herein. The publish-subscribe feature may be an example of one-to-many or oneto-one communication, which removes intermediaries and improves the trustworthiness of the event data.

Publisher node 103 may maintain a list of subscribers and subscription details corresponding to each subscriber. Upon receipt of the event data, publisher node 103 may identify one or more subscribers that have subscribed to the event data from blockchain-enabled reader 102. Accordingly, publisher node 103 may publish the received event data. In some examples, publishing the event data by publisher node 103 may include communicating the event data to an entity that has subscribed to receiving the event data from blockchain-enabled reader 102. In the example of FIG. 1, publishing the event data by publisher node 103 may include communicating the event data to subscriber node 110. In some other examples, publishing the event data by publisher node 103 may include making the event data accessible by respective subscribers (e.g., subscriber node 110).

In some examples, publisher node 103 may support features such as queuing, multicasting, or filtering, which may allow the event data to reach a much larger variety of applications/subscribers. In some examples, the OPC UA PubSub specification as implemented by publisher node 103 may define a message protocol that can be used with different encoding techniques such as, JavaScript Object Notation (JSON), UA Binary, or eXtensible Markup Language (XML). Also, multiple data transport techniques such as Advanced Message Queuing Protocol (AMQP), Message Queuing Telemetry Transport (MQTT), or Extensible Messaging and Presence Protocol (XMPP), may be used. In some examples, applications or client devices may register with publisher node 103 as subscriber, and publisher node 103 may communicate relevant event data to the subscribers based on the corresponding subscriptions. In some examples, the OPC UA PubSub specification as implemented by publisher node 103 may define a format for messages that allows them to be consumed by subscribers that have no knowledge of OPC UA, for example.

Blockchain network 104 may be coupled to blockchain-enabled reader 102 via network 106. Blockchain network 104 may be implemented as a public blockchain network, a private blockchain network, or a hybrid blockchain network having a combination of both the public blockchain network and the private blockchain network. As used herein, the term "public blockchain network" may refer to a blockchain network that is accessible to any entity and whereby any entity may participate in a consensus process in the public blockchain network. A public blockchain network may also be referred to as a "fully decentralized" blockchain network. Further, the term "private blockchain network" as used herein may refer to a blockchain network in which a limited set of trusted entities participate. In particular, in a private blockchain network, a permissioned set of participating nodes may participate in the consensus process. By way of example, a consortium of multiple financial institutions may form a private blockchain network. A right to read blockchain data from the private blockchain network may be restricted to trusted participating nodes. The private blockchain network may also be referred to as a permissioned blockchain network. Although some examples are described herein with respect to the private blockchain network, it should be appreciated that the technology disclosed herein may be adapted for use in public or hybrid blockchain networks.

Blockchain network 104, as depicted in FIG. 1, may be implemented as a consortium. For example, blockchain network 104 may be implemented by an enterprise consortium of companies that operate blockchain network 104. By way of example, blockchain network 104 may include a plurality of participating nodes, including but not limited to, blockchain IoT management sub-system 110, a blockchain ledger sub-system 112, and/or one or more additional participating nodes 114. In some embodiments, blockchain IoT management sub-system 110 may be registered with publisher node 103 as the subscriber to receive the event data pertaining to blockchain-enabled reader 102. Accordingly, blockchain IoT management sub-system 110 is also alternately referred to as a subscriber node 110 herein. In the description hereinafter, the terms "blockchain IoT management sub-system" and the "subscriber node" are interchangeably used. Also, in some examples, a decentralized identity may also be assigned to subscriber node 110. The decentralized identity of publisher node 103 may include a private key, a public key, and an attribute (e.g., location information, details of a custodian, expected parameters of event data, etc.) corresponding to subscriber node 110.

Each participating node 110, 112, 114 may be a computing node such as a computer, a device including a processor or microcontroller and/or any other electronic component, device or system that performs one or more operations according to one or more programming instructions. Examples of participating nodes 110, 112, and 114 may include, but are not limited to, a desktop computer, a laptop, a smartphone, a server system, a computer appliance, a workstation, and the like. In blockchain network 104, participating node 110, 112, 114 may be connected to each other via a network 105. In certain examples, network 105 may be analogues to network 106. In certain examples, participating node 110, 112, 114 may be connected to each other via network 106.

Although not shown, each of participating nodes 110, 112, 114 may include a processing resource and a machine readable medium. Non-limiting examples of the processing resource may include a microcontroller, a microprocessor, central processing unit core(s), application-specific integrated circuit (ASIC), a field programmable gate array (FPGA), etc. The machine readable medium may be a non-transitory storage medium, examples of which include, but are not limited to, a random access memory (RAM), a read-only memory (ROM), an electrically erasable programmable read-only memory (EEPROM), a flash memory, a hard disk drive, etc. The processing resource may execute instructions (i.e., programming or software code) stored on the machine readable medium to perform operations desired to be performed by participating nodes 110, 112, 114. Additionally or alternately, the processing resource may include electronic circuitry for performing the functionality described herein.

In blockchain network 104, some or all of participating nodes 112, 114 may include a copy of a distributed ledger. For convenience of representation, blockchain ledger sub-system 112 is shown including one copy of such distributed ledger 116. As used herein, the term "distributed ledger" may refer to a shared digital ledger that is decentralized and synchronized among participating nodes 112, 114 distributed across blockchain network 104. After a transaction is approved to be written or stored to distributed ledger 116, the transaction may be consented to by at least the majority of participating nodes 112, 114. The contents of distributed ledger 116 are synchronized across all participating nodes 112, 114. Different types of consensus mechanisms may be implemented on participating nodes 112, 114 to bring in varying levels of processing requirements to agree on the transaction amongst participating nodes 112, 114. Examples of common consensus mechanisms may include, but are not limited to, proof of work, proof of stake, proof of elapsed time, and/or consensus platforms such as a Kafka distributed streaming platform. In some examples, when a new participating node is added in blockchain network 104, a copy of distributed ledger 116 may be downloaded to the newly joined participating node.

In distributed ledger 116, data is generally stored as a blockchain of chronologically ordered, back-link listed data blocks. A number of data blocks in the blockchain may be connected together via hashing. For example, when a new block is added to the blockchain, the new block includes a hash reference such as a hash of a predecessor block. In this manner, several data blocks may be chained together to form a blockchain and each additional block may create additional security for a validity of the entire blockchain. This makes it difficult to retroactively alter data stored within the blockchain without that alteration being detected. A blockchain may include information about the participating nodes, an owner of a block, and content of the block extending from the first block to the most recently completed block (also referred to as the latest data block).

In some example implementations, participating nodes 112, 114 in blockchain network 104 may be able to write/store transactions on distributed ledger 116, but not verify transactions. In the example of FIG. 1, blockchain IoT management sub-system 110 may be operated as a verifier that verifies the decentralized identity of blockchain-enabled reader 102. In some examples, blockchain-enabled reader 102 may be registered with blockchain IoT management sub-system 110. In some examples, during such registration, blockchain IoT management sub-system 110 may provision the decentralized identity to blockchain-enabled reader 102. Also, blockchain IoT management sub-system 110 may store some of the decentralized identity information of blockchain-enabled reader 102 in a reference identity data store 118. For instance, reference identity data store 118 may store a decentralized identity of each blockchain-enabled reader registered with blockchain IoT management sub-system 110. By way of example, reference identity data store 118 may include a reference public key, a reference attribute, or both corresponding to each of the registered blockchain-enabled readers. The blockchain-enabled readers such as blockchain-enabled reader 102 that are registered with blockchain IoT management sub-system 110, are hereinafter referred to as a valid reader from which blockchain IoT management sub-system 110 can accept the event data for facilitating storage in distributed ledger 116.

During operation, subscriber node 110 (i.e., blockchain IoT management sub-system 110) may receive the event data published by publisher node 103 via network 106. In some examples, blockchain IoT management sub-system 110 may receive the event data published by publisher node 103 over networks 106 and 105. In some examples, in order to ensure that the event data is sent by authorized valid reader, blockchain IoT management sub-system 110 may verify the decentralized identity contained in the received event data. Blockchain IoT management sub-system 110 may extract the signature from the received event data and validate the signature using reference identity data store 118. In some examples, blockchain IoT management sub-system 110 may validate the signature using the reference public key to verify the decentralized identity of blockchain-enabled reader 102. If decentralized identity of blockchain-enabled reader 102 is successfully verified, blockchain IoT management sub-system 110 may accept the event data received from blockchain-enabled reader 102. Alternately, blockchain IoT management sub-system 110 may reject or discard the event data received from blockchain-enabled reader 102.

In some examples, subscriber node 110 may submit the event data for storage in distributed ledger 116 upon successful verification of the decentralized identity of blockchain-enabled reader 102. In some examples, subscriber node 110 may submit the event data to blockchain ledger sub-system 112 for storing the event data as a block in a blockchain in distributed ledger 116. In some examples, blockchain ledger sub-system 112 may perform an authorization check for the one or both of blockchain-enabled reader 102 or subscriber node 110 based on the identities of blockchain-enabled reader 102 or subscriber node 110, and parameters contained in the event data. In some examples, blockchain ledger sub-system 112 may perform such an authorization check to verify the event data using a smart contract, for example. Additional details of the authorization of blockchain-enabled reader 102 or subscriber node 110 and the smart contract will be described in greater detail in FIG. 2.

Further, in some examples, blockchain ledger sub-system 112 may determine whether consensus for storing the event data was reached among participating nodes 112, 114 in blockchain network 104. Different types of consensus mechanisms or programs may be used by participating nodes 112, 114 to implement varying levels of processing requirements to agree on a transaction (e.g., a request for storing the event data in the present example) amongst participating nodes 112, and 114 in blockchain network 104. Examples of the consensus mechanisms may include, but are not limited to, proof of work, proof of stake, proof of elapsed time, or Kafka.

Upon successful consensus among participating nodes 112, 114, blockchain ledger sub-system 112 may store the event data as a record or block in distributed ledger 116. Alternately or additionally, in some examples, blockchain ledger sub-system 112 may store the event data in distributed ledger 116 as a verifiable claim to prove that blockchain ledger sub-system 112 possesses verifiable credentials with certain characteristics. The verifiable claim may represent the event data signed by blockchain ledger sub-system 112 using the verifiable credentials associated with the blockchain ledger sub-system 112. The verifiable credentials can be verified by any verifier in blockchain network 104.

In particular, information in the event data may be stored as a block in a blockchain of chronologically ordered, back-link listed data blocks. In some examples, the information of the event data to be stored in the blockchain may include content of the event data, a cryptographic hash value of the content of the event data, metadata corresponding to the event data, a cryptographic hash value of the metadata, and/or combinations thereof. Data blocks in the blockchain may be connected together via hashing. For example, when a new block is added to the blockchain, the new block may include a hash reference such as a hash of a predecessor block. In this manner, the several data blocks may be chained together to form a blockchain and each additional block may create additional security for a validity of the entire blockchain. This makes it difficult to retroactively alter data stored within the blockchain without that alteration being detected. A blockchain has complete information about the participating nodes, an owner of a block and content of the block right from the first block to the most recently completed block (also referred to as a latest data block). Accordingly, blockchain provides high security with fewer chances of undetected tampering or breaches.

As illustrated in example FIG. 1, the functionalities of verifying the decentralized identity and storing the event data may be performed by different participating nodes 110, 112. As will be appreciated, the operations performed by subscriber node 110 and blockchain ledger sub-system 112 may be performed on a single participating node as well, without limiting the scope of the present disclosure.

As will be appreciated, blockchain-enabled reader 102, in accordance with various aspects of the present disclosure, may be registered with blockchain network 104 and may be provisioned with decentralized identity from blockchain network 104. Therefore, once the decentralized identity in the event data received from such blockchain-enabled reader 102 is verified, blockchain-enabled reader 102 may be considered trusted and the event data may be accepted for further processing. Further, blockchain-enabled reader 102 communicates with publisher node 103 using a machine-to-machine communication protocol such as the OPC standard or OPC UA standard along with the decentralized identity, where publisher node 103 operates as per publisher-subscriber configuration. Such publisher-subscriber configuration can facilitate communications with multiple subscribers (e.g., subscriber node 110) and/or multiple sources of data (e.g., blockchain-enabled reader 102).

Figure 2:
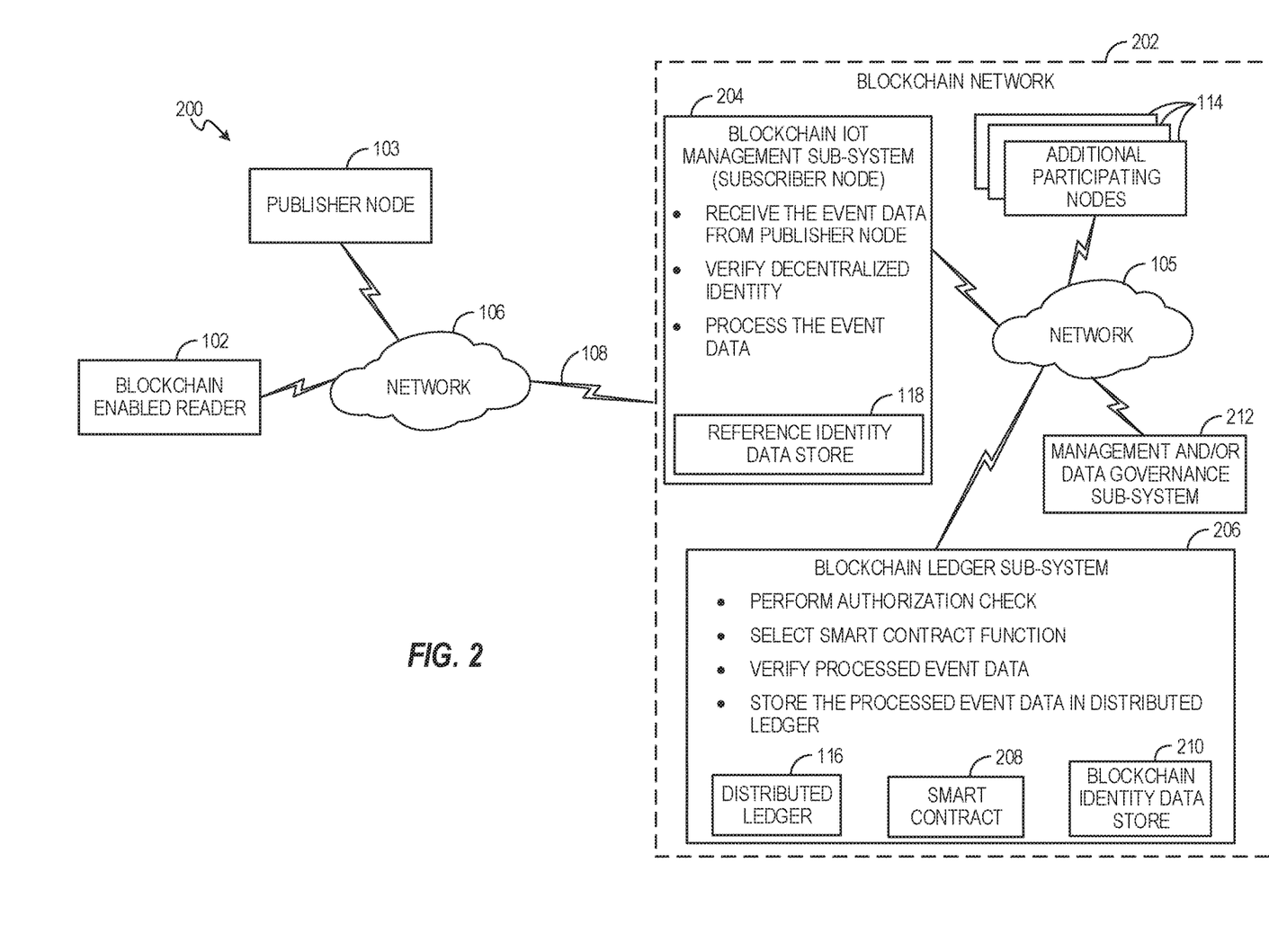
FIG. 2 illustrates a blockchain based IoT system, in accordance with another example.

FIG. 2 illustrates a blockchain based IoT system 200, in accordance with another example. Blockchain based IoT system 200 (hereinafter referred to as a blockchain IoT system 200) may include certain elements similar to those described in FIG. 1 which are marked with similar reference numerals, description of which are not repeated herein. Also, in some examples, a blockchain network 202 of FIG. 2 may be analogues to blockchain network 104 of FIG. 1. In particular, a subscriber node 204 and a blockchain ledger sub-system 206 are representative of one example of subscriber node 110 and the blockchain ledger sub-systems 112, respectively, of FIG. 1. In addition to the functions performed by subscriber node 110 and the blockchain ledger sub-systems 112, subscriber node 204 and blockchain ledger sub-systems 206 of FIG. 2 may perform certain additional functions in comparison to the functions performed by subscriber node 110 and the blockchain ledger sub-systems 112, respectively.

For example, in certain instances, the event data received from publisher node 103 may be unstructured, may include additional data that is irrelevant to a given business application or utility, and/or may contain redundant information. Therefore, upon successful verification of the decentralized identity of blockchain-enabled reader 102, subscriber node 204 may process the event data received from blockchain-enabled reader 102 to generate processed event data. In some examples, to facilitate such processing of the event data, subscriber node 204 may remove duplicate entries from the event data. Accordingly, after removal of the duplicate entries from the event data by subscriber node 204, the resulting processed event data may include unique entries.

Further, in some other examples, to facilitate the processing of the event data, subscriber node 204 may remove a predetermined type of information from the event data thereby retaining at least some contextual information. For instance, subscriber node 204 may remove the predetermined type of information such as any additional information that is irrelevant to the given business application or utility. For example, if a business application may require the location of an RFID tag to be stored in distributed ledger 116, subscriber node 204 may remove any data other than the location information of the RFID tag from the received event data. Therefore, once any such irrelevant additional information has been removed, the resulting processed event data may include desired contextual information.

Furthermore, in certain examples, to facilitate processing of the event data, subscriber node 204 may arrange parameters contained in the event data in a predefined template, wherein the processed event data includes the event data arranged in the predefined template. As will be appreciated, the predefined template may be selected to be any template, format, arrangement, and/or order of data as desired by the business application for storing the data in distributed ledger 116. By way of example, if the predefined template includes certain parameters contained in the event data to be listed in a particular order, subscriber node 204 may arrange the parameters in the particular order. For instance, if the predefined template requires humidity information to be presented after the temperature information, subscriber node 204 may arrange the humidity information after the temperature information in the processed event data. Although the predefined template as illustrated herein relates to an order of presenting various parameters, any type of predefined template may be chosen without limiting the scope of the present disclosure.

In some examples, subscriber node 204 may sign the processed data using a decentralized identity assigned to subscriber node 204. For example, subscriber node 204 may sign the processed data using a private key and an attribute associated with subscriber node 204.

In the example of FIG. 2, subscriber node 204 may verify a decentralized identity and process the event data. In some other examples, while subscriber node 204 may perform one of the two functionalities (e.g., processing the event data), the remaining other functionality (e.g., verifying the decentralized identity) may be performed by a different participating node (e.g., one of additional participating nodes 114 or blockchain ledger sub-systems 206), without limiting the scope of the present disclosure. In certain other examples, processing the event data may be performed by publisher node 103 and the processed event data may be provided to subscriber node 204 from publisher node 103. In such an arrangement, publisher node 103 may sign the processed data using a decentralized identity assigned to the publisher node 103. For example, publisher node 103 may sign the processed data using a private key and an attribute associated with publisher node 103.

In accordance with some aspects of the present disclosure, subscriber node 204 may communicate the processed event data to blockchain ledger sub-systems 206. Upon receipt of the processed event data, blockchain ledger sub-systems 206 may perform an authorization check for either or both blockchain-enabled reader 102 or subscriber node 204 based on the identities of blockchain-enabled reader 102 or subscriber node 204, and parameters contained in the processed event data. In some examples, blockchain ledger sub-system 206 may perform an authorization check to select a function (hereinafter referred to as a smart contract function) of a smart contract 208 corresponding to one or more of blockchain-enabled reader 102, subscriber node 204, and/or the parameters contained in the processed event data.

In some examples, blockchain ledger sub-system 206 may use identity information stored in a blockchain identity data store 210 to perform the authorization of blockchain-enabled reader 102 and subscriber node 204. Blockchain identity data store 210 may include identity information (i.e., decentralized identities) corresponding to all devices, parties, and systems that can communicate with blockchain ledger sub-system 206. In some examples, reference identity data store 118 stored in subscriber node 204 may provide reference to the identity information stored in blockchain identity data store 210 which is further stored in blockchain ledger sub-system 206. In certain other examples, the referenced identity data store 118 may be downloaded by subscriber node 204 from blockchain identity data store 210. As previously noted, the identity information such as the decentralized identity may also include attributes corresponding to a given device.

For a particular blockchain-enabled reader, in a given context, only certain parameters may be expected in the processed event data. For example, if a blockchain-enabled reader, such as, an RFID scanner associated at airport A, scans RFID tags associated with airport B, event data from the RFID scanner may be rejected. When the RFID scanner reports a correct and relevant attribute with a right digital signature, based on the attribute, corresponding processed event data may be considered for further processing by blockchain ledger sub-system 206. During the authorization check, blockchain ledger sub-system 206 may authorize blockchain-enabled reader 102 and subscriber node 204 for access to certain context applicable thereto. For example, a blockchain-enabled reader may be authorized for use in scanning RFID tags located in a given facility premises (e.g., the paint shop of an automobile factory) but not in other facility premise (e.g., a robotic welding area of the automobile factory). In such a scenario, if such blockchain-enabled reader is used to scan an RFID tag in the unauthorized premise, blockchain ledger sub-system 206 may disqualify the processed event data containing the event data generated by such blockchain-enabled reader based on scanning of the RFID tag in the unauthorized premise. In another example, if subscriber node 204 submits processed event data pertaining to a blockchain-enabled reader for which subscriber node 204 is not authorized, blockchain ledger sub-system 206 may disqualify such processed event data from being stored in distributed ledger 116.

Moreover, blockchain ledger sub-system 206 may allow the receipt of the processed event data from a subscriber node or a blockchain-enabled reader that is authorized for a given context. For example, if a blockchain-enabled reader is authorized for use in scanning RFID tags located in the paint shop of the automobile factory, blockchain ledger sub-system 206 may authorize such blockchain-enabled reader if associated processed event data corresponds to the paint shop of the automobile factory.

As noted earlier, blockchain ledger sub-system 206 may perform an authorization check to select the smart contract function of smart contract 208 corresponding to one or more of blockchain-enabled reader 102, subscriber node 204, and/or the parameters contained in the processed event data. The term "smart contract" as used herein may refer to processor executable code residing in a blockchain network, e.g. blockchain network 202. Smart contract 208 automates execution of transactions between trusted parties (i.e., parties that have proved their credentials) based on processor executable contract terms. Transactions that happen via smart contract 208 are processed on blockchain network 202 without any intermediary. In the present scenario, in some examples, smart contract 208 may include various program instructions, the execution of which may verify if the processed event data received from subscriber node 204 meets a desired criteria. In some examples, the processed event data may include values of one or more parameters. The desired criteria may, for example, be a predetermined range, or a minimum and/or maximum threshold value. In some examples, smart contract 208 may include smart contract functions for various businesses and business contexts, consistent with any participating nodes, e.g., participating nodes 204, 206, and/or 114 of blockchain network 202.

In some examples, blockchain ledger sub-system 206 may select a smart contract function relevant to one or more of blockchain-enabled reader 102, subscriber node 204, or parameters contained in the processed event data. Further, blockchain ledger sub-system 206 may execute the selected smart contract function, thereby performing the verification of the processed event data for storing the event data in distributed ledger 116.

Upon successful verification of the processed event data as noted herein, blockchain ledger sub-systems 206 may store the processed event data in a distributed ledger 116. In some examples, blockchain ledger sub-systems 206 may require consent from all or at least a majority of participating nodes 206 and 114 for storing the processed event data in distributed ledger 116. For example, upon successful verification of the processed event data, blockchain ledger sub-systems 206 may determine whether consensus for storing the processed event data was reached among participating nodes 206 and 114 in blockchain network 202. Different types of consensus mechanisms or programs may be used by participating nodes 206 and 114 to implement varying levels of processing requirements to agree on a transaction (e.g., a request for storing the processed event data in the present example) amongst participating nodes 206 and 114 in blockchain network 202. Examples of the consensus mechanisms may include, but are not limited to, proof of work, proof of stake, proof of elapsed time, or Kafka.

Upon achieving consensus among participating nodes 206 and 114, blockchain ledger sub-systems 206 may store the processed event data as a record or block in distributed ledger 116. Alternately or additionally, in some examples, blockchain ledger sub-system 206 may store the processed event data in distributed ledger 116 as a verifiable claim to prove that blockchain ledger sub-system 206 possesses verifiable credentials with certain characteristics. The verifiable claim may represent the event data signed by blockchain ledger sub-system 206 using the verifiable credentials associated with the blockchain ledger sub-system 206. The verifiable credentials can be verified by any verifier in blockchain network 202.

In particular, the processed event data and/or the verifiable claim may be stored as a block in a blockchain of chronologically ordered, back-link listed data blocks. In some examples, the information of the processed event data to be stored in the blockchain may include content of the processed event data, a cryptographic hash value of the content of the processed event data, metadata corresponding to the processed event data, a cryptographic hash value of the metadata, and/or combinations thereof. Data blocks in the blockchain may be connected together via hashing.

In the example of FIG. 2, the functionalities of, verifying the decentralized identity, processing the event data, verifying the processed event data, and storing the processed event data are shown to be performed by different participating nodes 204 and 206. As will be appreciated, the operations performed by subscriber node 204 and blockchain ledger sub-systems 206 may be performed on a single participating node as well, without limiting the scope of the present disclosure.

Further, in some examples, blockchain IoT system 200 may include a management and/or data governance sub-system 212. Management and/or data governance sub-system 212 may be a computing device similar to any of participating nodes 204, 206, and 114 and may include a processing resource and machine readable medium similar to those described in FIG. 1. In some examples, management and/or data governance sub-system 212 may provide secure access to blockchain information stored in distributed ledger 116 to a requester depending on access rights associated with the requester. The requester may be a user, a customer, a computing node, or a company. The requester may connect to management and/or data governance sub-system 212 via use of one or more applications and/or application programming interface (API) calls. It is to be noted that management and/or data governance sub-system 212 is shown as a separate participating node in blockchain IoT system 200 for illustration purposes. In some examples, the functionalities performed by management and/or data governance sub-system 212 may be embedded into any of participating nodes 204, 206, and 114 without limiting the scope of the present disclosure.

As will be appreciated, blockchain-enabled reader 102, in accordance with various aspects of the present disclosure, may be registered with blockchain network 202, and a decentralized identity may be provisioned from blockchain network 202. Therefore, once the decentralized identity in the event data received from such blockchain-enabled reader 102 is verified, blockchain-enabled reader 102 may be considered trusted and the event data can be accepted for further processing. Further, blockchain-enabled reader 102 communicates with publisher node 103 using a machine-to-machine communication protocol such as the OPC standard, OPC UA standard, MQTT, CoAP, or similar standards along with the decentralized identity, where the publisher node 102 operates as per publisher-subscriber configuration. Such publisher-subscriber configuration may facilitate communications with multiple subscribers (e.g., subscriber node 204) and/or multiple sources of data (e.g., blockchain-enabled reader 102). Moreover, subscriber node 204 in the proposed blockchain network, in accordance with the aspects of the present disclosure, may process the received event data, thereby generating the processed event data. Various processing performed by subscriber node 204 may include one or more of the following: removing duplicate entries from the event data, arranging parameters contained in the event data in a predefined template, and/or removing a predetermined type of information from the event data thereby retaining at least some contextual information of the event data. Accordingly, the proposed solution facilitates relevant and structured data in blockchain network 202 for storing in distributed ledger 116.

Figure 3:
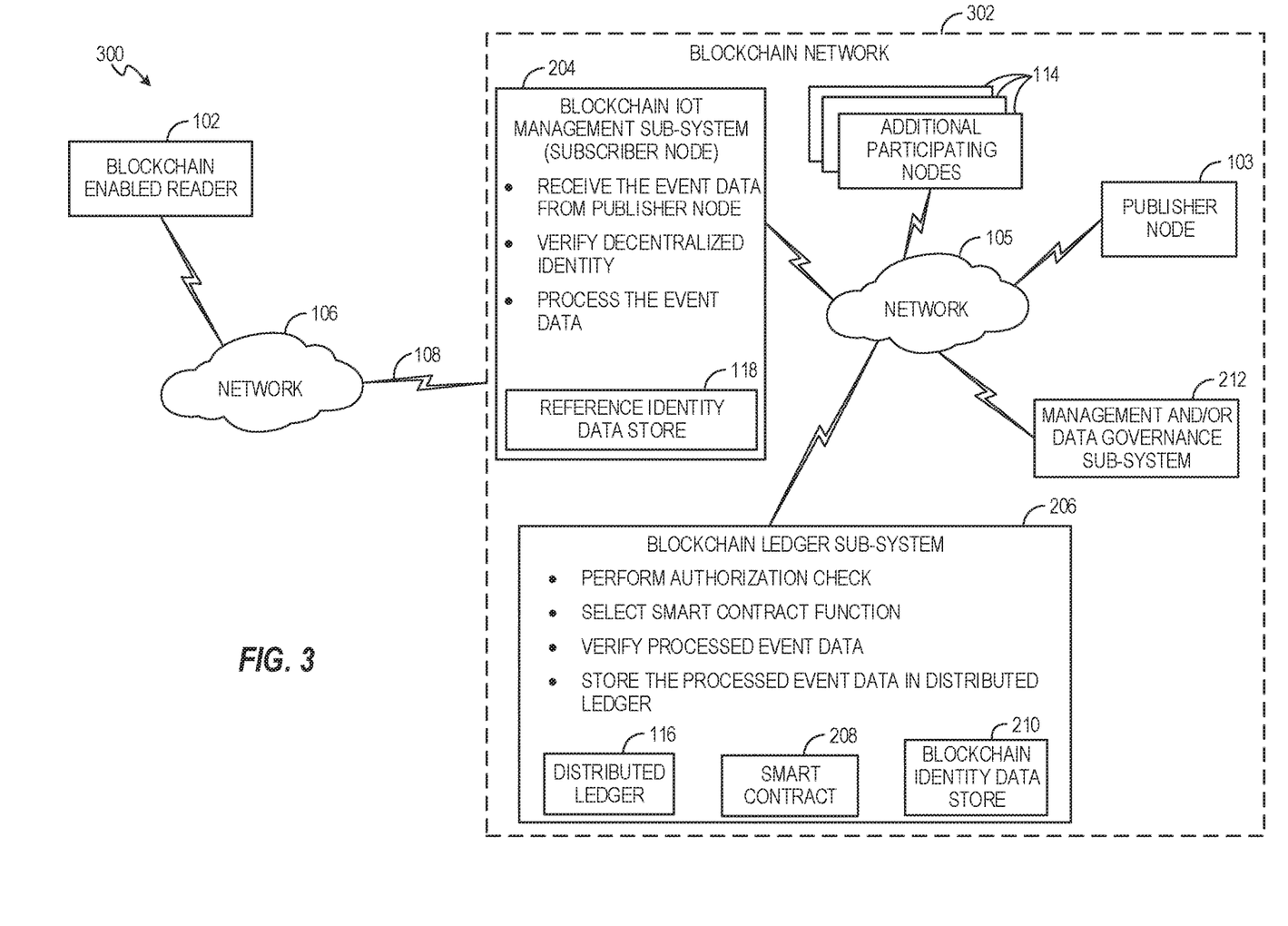
FIG. 3 illustrates a blockchain based IoT system, in accordance with yet another example.

FIG. 3 illustrates a blockchain based IoT system 300 in accordance with another example. Blockchain based IoT system 300 (hereinafter referred to as a blockchain IoT system 300) may include certain elements similar to those described in FIGS. 1 and 2 which are marked with similar reference numerals, description of which is not repeated herein. Also, in some examples, blockchain network 302 of FIG. 3 may be analogues to blockchain network 202 of FIG. 2. In particular, blockchain network 302 of FIG. 3 may also include publisher node 103 as a participating node. Publisher node 103 may receive the event data from blockchain-enabled reader 102 via the networks 106 and 105 and may communicate the event data to subscriber node 204 via network 105.

Figure 4:
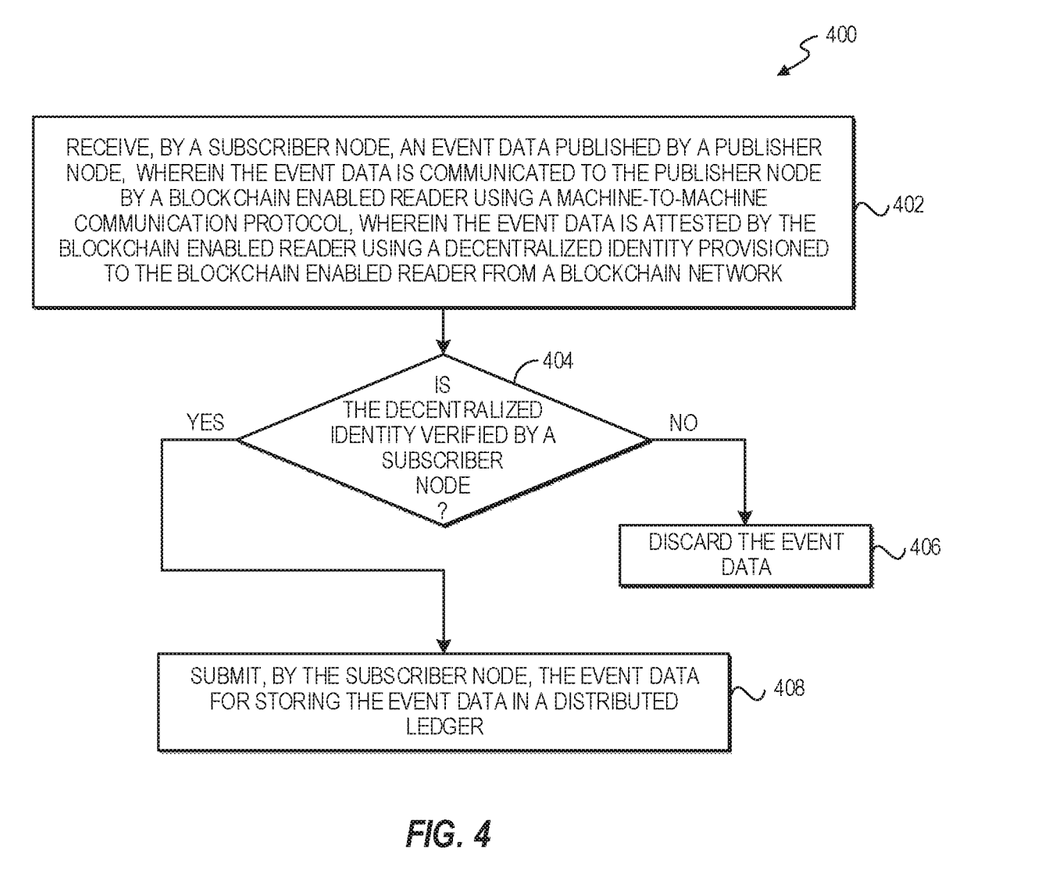
FIG. 4 is a flow diagram depicting a method for storing event data from a blockchain-enabled reader in a distributed ledger, in accordance with an example.

FIG. 4 is a flow diagram depicting a method 400 for storing event data from a blockchain-enabled reader such as blockchain-enabled reader 102 in a distributed ledger, in accordance with an example. For ease of illustration, method 400 will be described with reference to blockchain IoT system 100 of FIG. 1. As will be appreciated, features described herein are also applicable to blockchain IoT system 200 of FIG. 2 and blockchain IoT system 300 of FIG. 3.

At block 402, method 400 includes receiving the event data published by publisher node 103. The event data is sent to publisher node 103 by blockchain-enabled reader 102 in accordance with a machine-to-machine communication protocol, such as, but not limited to, OPC, OPC UA, MQTT, or CoAP standards. Also, as previously noted, the event data may be attested/signed by blockchain-enabled reader 102 using its decentralized identity. Further, at block 404, a check may be performed by subscriber node 110. In an example, the check may be performed after receiving the event data from a publisher using a publisher-subscriber communication standard integrated with the decentralized identity to verify the decentralized identity associated with blockchain-enabled reader 102. In some examples, verifying the decentralized identity includes validating the signature contained in the event data using reference identity data store 118. For example, verifying the decentralized identity includes validating the signature contained in the event data using the reference public key corresponding to blockchain-enabled reader 102.

At block 404, if the decentralized identity associated with blockchain-enabled reader 102 is not valid and otherwise failed authentication, subscriber node 110 may discard the event data received from blockchain-enabled reader 102 as indicated at block 406. However, at block 404, if the decentralized identity associated with blockchain-enabled reader 102 is successfully verified, the event data received from blockchain-enabled reader 102 may be submitted for storing in distributed ledger 116. For example, subscriber node 110 may submit the event data to blockchain ledger sub-system 112 for facilitating storage of the event data in distributed ledger 116. As previously noted, blockchain ledger sub-system 112 may determine whether consensus for storing the event data was reached among participating nodes 112, 114 in blockchain network 104. Upon successful consensus among participating nodes 112, 114, blockchain ledger sub-system 112 may store the event data as a record or block in distributed ledger 116. In particular, information of the event data may be stored as a block in a blockchain of chronologically ordered, back-link listed data blocks. In some examples, blockchain ledger sub-system 112 may proceed to check consensus after performing an authorization check for blockchain-enabled reader 102 and/or subscriber node 110. Details of such authorization check is described in greater detail in FIG. 2.

Figure 5:
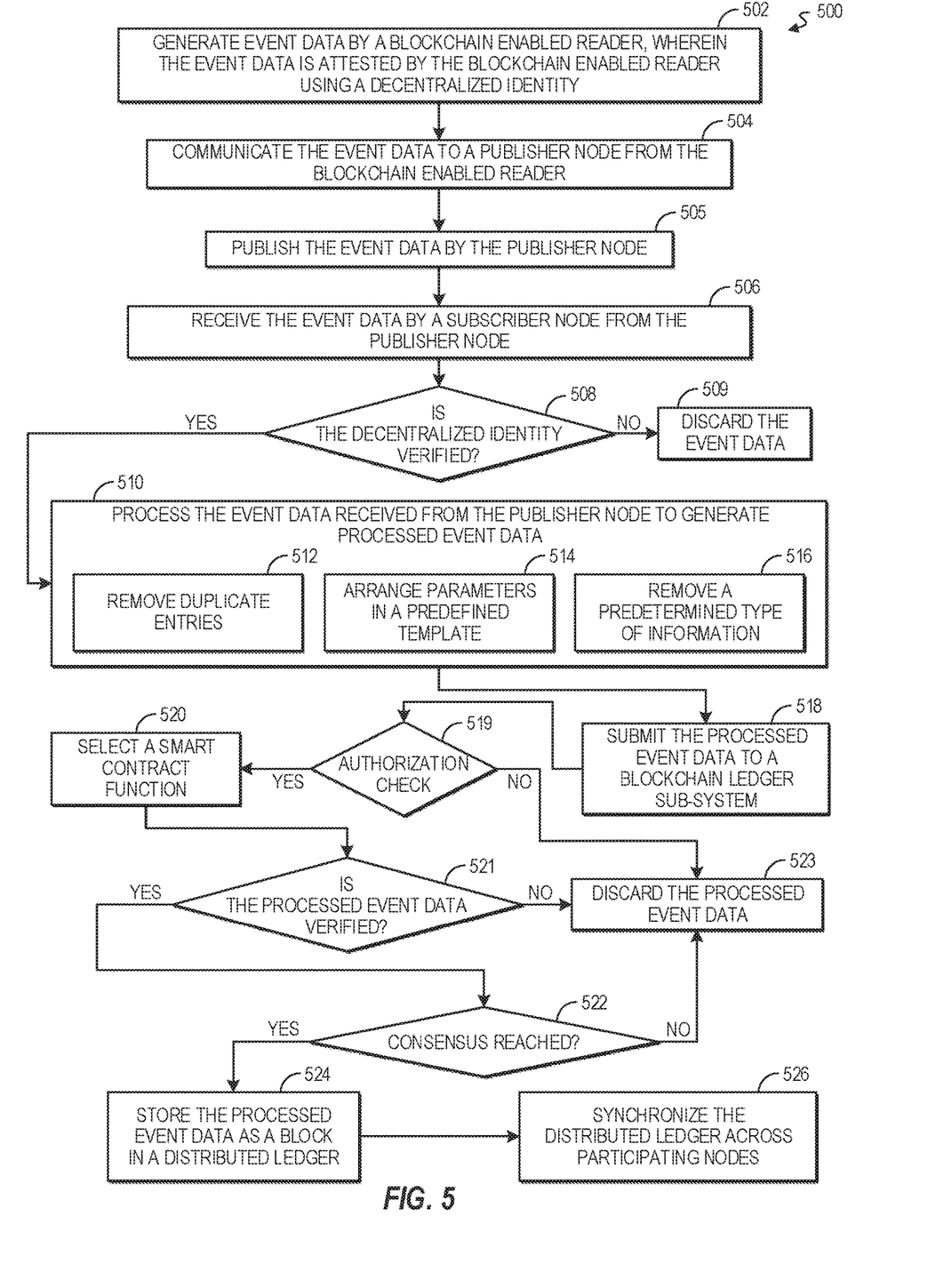
FIG. 5 is a flow diagram depicting a method for storing event data from a blockchain-enabled reader in a distributed ledger, in accordance with another example.

Referring now to FIG. 5, a flow diagram depicting a detailed example method 500 for storing event data from a blockchain-enabled reader such as blockchain-enabled reader 102 in a distributed ledger is provided. For ease of illustration, method 500 will be described with reference to blockchain IoT system 200 of FIG. 2. As will be appreciated, features described herein are also applicable to the blockchain IoT systems 100 of FIG. 1 and the blockchain IoT systems 300 of FIG. 3.

At block 502, blockchain-enabled reader 102 may generate event data. As previously noted, the event data may be attested by blockchain-enabled reader 102 using the decentralized identity provisioned to blockchain-enabled reader 102. At block 504, the event data may be communicated to publisher node 103 from blockchain-enabled reader 102 via network 106. In particular, the event data may be communicated to publisher node 103 from blockchain-enabled reader 102 in accordance with the machine-to-machine communication protocol, such as, but not limited to, OPC, OPC UA, MQTT, or CoAP standards. Also, as previously noted, the event data may be attested by blockchain-enabled reader 102 using its decentralized identity and includes a signature based on such attestation by the decentralized identity.

Further, at block 505, method 500 includes publishing the event data by publisher node 103. As previously noted, in some examples, publishing the event data by publisher node 103 may include communicating the event data to an entity that has subscribed to receiving the event data from blockchain-enabled reader 102. For example, publishing the event data by publisher node 103 may include communicating the event data to subscriber node 204. In some other examples, publishing the event data by publisher node 103 may include making the event data accessible by respective subscribers (e.g., subscriber node 204). Further, blocks 506, 508, and 509 of method 500 are analogues to blocks 402, 404, and 406, respectively, of method 400 of FIG. 4. Accordingly, description of blocks 506, 508, and 509 is not repeated herein.

At block 508, if the decentralized identity associated with blockchain-enabled reader 102 is not verified, subscriber node 204 may discard the event data received from blockchain-enabled reader 102, as indicated at block 509. However, at block 508, if the decentralized identity associated with blockchain-enabled reader 102 is successfully verified, the event data received from blockchain-enabled reader 102 is processed by subscriber node 204 to generate processed event data at block 510. In some examples, processing of the event data at block 510 includes performing operations at one or more of blocks 512, 514, or 516. In some examples, at block 512, method 500 includes removing duplicate entries from the event data. In some examples, at block 514, method 500 includes arranging parameters in the event data in a predefined template. In some examples, at block 516, method 500 includes removing a predetermined type of information from the event data thereby retaining at least some contextual information of the event data. Additional details of the operations performed at blocks 512, 514, and 516 have been described in conjunction with FIG. 2.

Further, once the processed data is generated, at block 518, subscriber node 204 may submit the processed event data to blockchain ledger sub-system 206. Upon receipt of the processed event data, at block 519, blockchain ledger sub-system 206 may perform an authorization check for the one or both of blockchain-enabled reader 102 or subscriber node 204 based on identities of blockchain-enabled reader 102 and subscriber node 204. In some examples, the authorization check may also take into account the values of parameters contained in the processed event data in addition to the identities of the submitting devices (e.g., blockchain-enabled reader 102 and/or subscriber node 204). Details of the authorization check performed by blockchain ledger sub-system 206 is described in conjunction with FIG. 2.

At block 519, if blockchain-enabled reader 102 or subscriber node 204 is not authorized by blockchain ledger sub-system 206, blockchain ledger sub-system 206 may discard the processed event data at block 523. However, at block 519, if blockchain-enabled reader 102 and subscriber node 204 are authorized by blockchain ledger sub-system 206, at block 520, blockchain ledger sub-system 206 may select a smart contract function corresponding to one or more of blockchain-enabled reader 102, subscriber node 204, and/or the parameters contained in the processed event data. For example, for a particular blockchain-enabled reader, in a given context, only certain parameters may be expected in the processed event data. Accordingly, blockchain ledger sub-system 206 may select a particular smart contract function related to the particular blockchain-enabled reader and the parameters that may be expected from the particular blockchain-enabled reader.

Furthermore, at block 521, a check may be performed by blockchain ledger sub-system 206 to verify the processed event data. In some examples, blockchain ledger sub-system 206 may perform the check by executing the selected smart contract function to verify processed event data for storing the event data in distributed ledger 116. At block 521, if the processed event data is not verified using the smart contract function, blockchain ledger sub-system 206 may discard the processed event data as indicated by block 523. However, at block 521, if the processed event data is successfully verified using the smart contract function, at block 522, another check may be performed by the blockchain ledger sub-system 206 to determine whether consensus for storing the processed event data was reached among participating nodes 206 and 114 in blockchain network 104. As previously noted, consensus mechanisms used to determine the consensus for storing the processed event among participating nodes 206 and 114 may include, but are not limited to, proof of work, proof of stake, proof of elapsed time, Kafka, etc.

At block 522, if no consensus for storing the processed event data was reached among participating nodes 206 and 114, blockchain ledger sub-systems 206 may discard the processed event data. However, at block 522, if consensus for storing the processed event data was reached among all or a predetermined majority of participating nodes 206 and 114, at block 524, blockchain ledger sub-systems 206 may store the processed event data as a record or block in distributed ledger 116. Alternately or additionally, in some examples, blockchain ledger sub-system 206 may store the processed event data in distributed ledger 116 as a verifiable claim to prove that blockchain ledger sub-system 206 possesses verifiable credentials with certain characteristics. The verifiable claim may represent the processed event data signed by blockchain ledger sub-system 206 using the verifiable credentials associated with the blockchain ledger sub-system 206. As noted earlier, information of the processed event data and/or the verifiable claim may be stored as a block in a blockchain of chronologically ordered, back-link listed data blocks. Moreover, at block 526, the distributed ledger on each of participating nodes 206 and 114 may be synchronized such that the distributed ledger on each of participating nodes 206 and 114 stores identical data.

Figure 6:
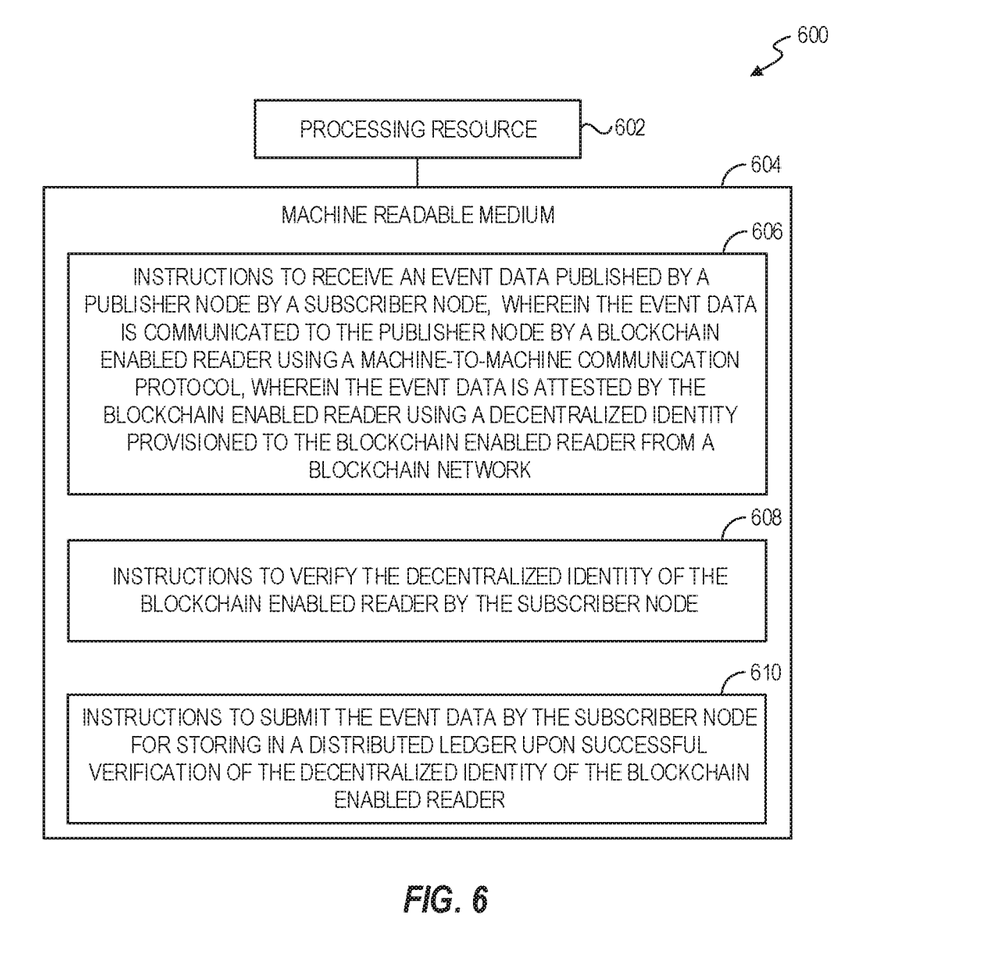
FIG. 6 is a block diagram depicting a processing resource and a machine readable medium encoded with example instructions to store event data from a blockchain-enabled reader in a distributed ledger, in accordance with an example.

Referring now to FIG. 6, a block diagram 600 depicting a processing resource 602 and a machine readable medium 604 encoded with example instructions to store the event data from the blockchain-enabled reader 202 in distributed ledger 116, in accordance with an example. Machine readable medium 604 is non-transitory and is alternately referred to as a non-transitory machine readable medium 604. In some examples, machine readable medium 604 may be accessed by processing resource 602. In some examples, processing resource 602 and machine readable medium 604 may be included in subscriber node 110, for example.

Non-limiting examples of processing resource 602 may include a microcontroller, a microprocessor, central processing unit core(s), an application-specific integrated circuit (ASIC), a field programmable gate array (FPGA), etc. Machine readable medium 604 may be a non-transitory storage medium, examples of which include, but are not limited to, a random access memory (RAM), a read-only memory (ROM), an electrically erasable programmable read-only memory (EEPROM), a flash memory, a hard disk drive, etc. Processing resource 602 may execute instructions (i.e., programming or software code) stored in machine readable medium 604 to perform operations desired to be performed by subscriber node 110. Additionally or alternately, processing resource 602 may include electronic circuitry for performing the functionality described herein.

In some examples, machine readable medium 604 may be encoded with example instructions 606, 608, and 610. The instructions 606, 608, and 610 (hereinafter collectively referred to as instructions 606-610) of FIG. 6, when executed by processing resource 602, may implement aspects of storing the event data generated by blockchain-enabled reader 102 in blockchain network 104. In particular, the instructions 606-610 of FIG. 6 may be useful for performing the functionalities of the subscriber 110 and, at least partially, the methods described in FIGS. 4 and 5. In the description hereinafter, for ease of illustration, the instructions 606-610 will be described with reference to blockchain IoT system 100 of FIG. 1. As will be appreciated, features described herein are also applicable to the blockchain IoT systems 200, 300 of FIGS. 2-3.

The instructions 606, when executed, may cause processing resource 602 to receive event data published by publisher node 103 by subscriber node 110. The event data may be communicated to publisher node 103 by blockchain-enabled reader 102 using the machine-to-machine communication protocol, such as, the OPC, the OPC UA, MQTT, or CoAP standards. Also, the event data may be attested by blockchain-enabled reader 102 using the decentralized identity provisioned to the blockchain-enabled reader from a blockchain network. Further, the instructions 608, when executed, may cause processing resource 602 to verify the decentralized identity associated with blockchain-enabled reader 102. Furthermore, the instructions 610, when executed, may cause processing resource 602 to submit the event data to blockchain ledger sub-system 112 for storing the event data in a distributed ledger 116. In some examples, the instructions 606-610 may include various instructions to execute at least a part of the methods described in FIGS. 4-5 (described earlier). Also, although not shown in FIG. 6, machine readable medium 604 may also include additional program instructions to perform various other method blocks described in FIGS. 4-5.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
  receiving, by a subscriber node in a blockchain network, event data published by a publisher node, wherein the event data is communicated to the publisher node by a blockchain-enabled reader using a machine-to-machine communication protocol, and wherein the event data is signed by the blockchain-enabled reader using a private key and location information regarding a location of the blockchain-enabled reader so that a signature is included in the event data, the private key and the location information included in a decentralized identity provisioned to the blockchain-enabled reader from the blockchain network;
  verifying, by the subscriber node in the blockchain network, the decentralized identity of the blockchain-enabled reader using a public key, wherein the verifying comprises extracting, from the event data, the signature based on the private key and the location information included in the decentralized identity, and validating the signature using the public key;
  submitting, by the subscriber node to a blockchain ledger system, the event data for storing in a distributed ledger in response to successful verification of the decentralized identity of the blockchain-enabled reader;
  selecting, by the blockchain ledger system, a smart contract function for a given context based on parameters in the event data, wherein the selected smart contract function is selected, based on a value of a parameter of the parameters relative to a threshold, from a plurality of smart contract functions for respective contexts; and
  verifying the event data by the selected smart contract function.

2. The method of claim 1, wherein the publisher node is a participating node of a plurality of participating nodes in the blockchain network.

3. The method of claim 1, wherein the publisher node is a non-participating node with respect to the blockchain network.

4. The method of claim 1, wherein the machine-to-machine communication protocol is selected from among an Open Platform Communications (OPC) standard, an OPC Unified Architecture (UA) standard, a Message Queuing Telemetry Transport (MQTT) protocol, a Constrained Application Protocol (CoAP), or combinations thereof.

5. The method of claim 1, further comprising:
  in response to the successful verification of the decentralized identity of the blockchain-enabled reader, processing, by the subscriber node, the event data by arranging the parameters of the event data in a predefined template,
  wherein the submitting of the event data for storing in the distributed ledger comprises submitting the processed event data for storing in the distributed ledger.

6. The method of claim 1, wherein the decentralized identity further comprises a name or identification of an organization in which the blockchain-enabled reader is deployed.

7. The method of claim 1, wherein the validating of the signature uses a reference identity data store that includes the public key and a reference attribute, the reference attribute comprising reference location information of the blockchain-enabled reader.

8. The method of claim 1, further comprising processing the event data to generate processed event data by the subscriber node.

9. The method of claim 8, further comprising:
  authorizing the blockchain-enabled reader and the subscriber node based on an identity of the blockchain-enabled reader, an identity of the subscriber node, and parameters contained in the processed event data,
  wherein the verifying of the event data comprises verifying the processed event data by the selected smart contract function.

10. The method of claim 9, further comprising:
  determining, by the blockchain ledger system in response to successful verification of the processed event data, whether consensus for storing the processed event data was reached among participating nodes in the blockchain network; and
  storing, by the blockchain ledger system, one or both of the processed event data or a verifiable claim as a record or block in the distributed ledger in response to reaching the consensus among the participating nodes, wherein the verifiable claim comprises the processed event data signed by the blockchain ledger system using credentials.

11. The method of claim 8, wherein the processing of the event data comprises arranging the parameters of the event data in a predefined template, and wherein the selecting of the smart contract function for the given context is based on the parameters in the processed event data.

12. A system comprising:
a blockchain ledger system in a blockchain network; and
a subscriber node that is a participating node in the blockchain network, wherein the subscriber node comprises a processor and a non-transitory storage medium storing instructions executable on the processor to:
receive, at the subscriber node, event data published by a publisher node, the event data communicated to the publisher node by a blockchain-enabled reader using a machine-to-machine communication protocol, wherein the event data is signed by the blockchain-enabled reader using a private key and location information regarding a location of the blockchain-enabled reader so that a signature based on the private key and the location information is included in the event data, the private key and the location information included in a decentralized identity provisioned to the blockchain-enabled reader from the blockchain network;
verify the decentralized identity of the blockchain-enabled reader using a public key, wherein the verifying comprises extracting, from the event data, the signature based on the private key and the location information included in the decentralized identity, and validating the signature using the public key;
submit, from the subscriber node to the blockchain ledger system, the event data for storing in a distributed ledger in response to successful verification of the decentralized identity of the blockchain-enabled reader,
wherein the blockchain ledger system is to:
select a smart contract function for a given context based on parameters in the event data, wherein the selected smart contract function is selected, based on a value of a parameter of the parameters relative to a threshold, from a plurality of smart contract functions for respective contexts; and
verify the event data using the selected smart contract function.

13. The system of claim 12, wherein the machine-to-machine communication protocol is selected from among an OPC standard, an OPC UA standard, an MQTT protocol, a CoAP, or combinations thereof.

14. The system of claim 12, wherein the publisher node is a participating node in the blockchain network.

15. The system of claim 12, wherein the publisher node is a non-participating node with respect to the blockchain network.

16. The system of claim 12, wherein the instructions are executable on the processor in the subscriber node to:
in response to the successful verification of the decentralized identity of the blockchain-enabled reader, process, at the subscriber node, the event data by arranging the parameters of the event data in a predefined template,
wherein the submitting of the event data for storing in the distributed ledger comprises submitting the processed event data for storing in the distributed ledger.

17. The system of claim 12, wherein the validating of the signature uses a reference identity data store that includes the public key and a reference attribute, the reference attribute comprising reference location information of the blockchain-enabled reader.

18. The system of claim 12, wherein the instructions are executable on the processor in the subscriber node to process the event data to generate processed event data in response to the successful verification of the decentralized identity.

19. The system of claim 18, wherein the blockchain ledger system is to:
authorize the blockchain-enabled reader and the subscriber node based on an identify of the blockchain-enabled reader, an identity of the subscriber node, and parameters contained in the processed event data,
wherein the verifying of the event data comprises verifying the processed event data using the selected smart contract function;
in response to successful verification of the processed event data, determine whether consensus for storing the processed event data was reached among participating nodes in the blockchain network; and
store the processed event data or both the processed event data and a verifiable claim as a record or block in the distributed ledger in response to reaching the consensus among the participating nodes, wherein the verifiable claim comprises the processed event data signed by the blockchain ledger system using credentials.

20. A non-transitory machine readable medium storing instructions executable by a processing resource to:
receive, at subscriber node in a blockchain network, event data published by a publisher node, wherein the event data is communicated to the publisher node by a blockchain-enabled reader using a machine-to-machine communication protocol, and wherein the event data is signed by the blockchain-enabled reader using a private key and location information regarding a location of the blockchain-enabled reader so that a signature is included in the event data, the private key and the location information included in a decentralized identity provisioned to the blockchain-enabled reader from the blockchain network;
verify, at the subscriber node in the blockchain network, the decentralized identity of the blockchain-enabled reader using a public key, wherein the verifying comprises extracting, from the event data, the signature based on the private key and the location information included in the decentralized identity, and validating the signature using the public key;
in response to successful verification of the decentralized identity of the blockchain-enabled reader, submit, from the subscriber node to a blockchain ledger system, the event data for storing in a distributed ledger;
select, at the blockchain ledger system, a smart contract function for a given context based on parameters in the event data, wherein the selected smart contract function is selected, based on a value of a parameter of the parameters relative to a threshold, from a plurality of smart contract functions for respective contexts; and
verify the event data using the selected smart contract function.

* * * * *